2,938,932

PREPARATION OF ACETYLENIC GRIGNARD COMPOUNDS

Henri Normant, Paris, France, assignor to Societe des Usines Chimiques Rhone-Poulenc, Paris, France, a French body corporate No Drawing. Filed Nov. 29, 1957, Ser. No. 699,533

Claims priority, application France Dec. 3, 1956

8 Claims. (Cl. 260—665)

The present invention relates to the preparation of acetylenic Grignard reagents.

Acetylenic Grignard compounds are usually prepared by the interaction of a Grignard magnesium compound of the general formula R'MgX (where R' is a non-acetylenic alkyl, aryl, or aralkyl group, containing no groups reactive under the conditions of the reaction, and X is a halogen atom) with an acetylenic compound of the general formula R.C≡CH (where R is an alkyl, aryl, or aralkyl group containing no radicals reactive under the conditions of the reaction). Ethyl magnesium bromide is the Grignard reagent generally used, though butyl magnesium chloride has also been used. Iodo-magnesium compounds give side reactions and are rarely employed. The reaction proceeds in accordance with the equation:

$$R'MgX + R.C{\equiv}CH \rightarrow R.C{\equiv}CMgX + R'H$$

It is known (see for example Truchet, Annales de Chimie, 16 (1931) p. 309; Raphael, Acetylenic Compounds in Organic Synthesis, Butterworths Scientific Publications, London (1955), p. 58) that the preparation of acetylenic Grignard compounds by the reaction of acetylenic halides of general formula R.C≡C.X (R and X being as hereinbefore defined) with magnesium, according to the usual procedure for the preparation of Grignard reagents, proceeds only where the halide is an iodide. It is further known that even with iodides yields are low.

It has now unexpectedly been discovered that good yields of acetylenic Grignard compounds may be obtained by the reaction of halides of the general formula R.C≡C.X' (where R is as hereinbefore defined and X' is a chlorine or bromine atom) with magnesium, provided that the reaction is carried out in the presence of a cyclic ether or a polyethylene glycol diether as solvent.

According to the present invention, therefore, a process for the production of acetylenic Grignard compounds comprises reacting an acetylenic compound of the general formula R.C≡C.X' (where R and X' are as hereinbefore defined) with magnesium, under substantially anhydrous conditions, in a liquid reaction medium consisting of a cyclic ether of general formula

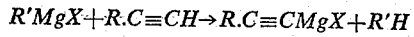

(wherein n is 4 or 5 and one or more of the hydrogen atoms are optionally substituted by radicals not capable of reacting under the conditions of the reaction), or of a polyethylene glycol diether of general formula R"(OCH$_2$CH$_2$)$_n$OR''' (wherein R" and R''' represent the same or different alkyl groups and n is an integer).

The cyclic ethers preferred for the reaction are tetrahydrofuran, 2-methyl-tetrahydrofuran, and tetrahydropyran. When polyethylene glycol diethers are used as solvents those in which R" and R''' each contain not more than 4 carbon atoms and n is 2 or 3 are preferred. When reaction is performed in the presence of diethylene glycol dimethylether, the acetylenic Grignard compounds obtained are somewhat less soluble and it may be necessary to apply extended heating and good stirring in order to promote the reaction. The reaction is preferably carried out under a current of dry nitrogen, and in a manner similar to that used for the preparation of other Grignard reagents.

An initiator (e.g. a crystal of iodine) may be used to start the reaction. The yield of magnesium derivative is excellent, as is clearly apparent from the total yield obtained when the magnesium derivative is condensed, without being isolated from the solution, with a substance capable of reacting therewith.

The following non-limitative examples illustrate the invention:

EXAMPLE I 24.3 grams of magnesium (1 mole) are placed in a dry flask, from which moisture is excluded and through which dry nitrogen is passed. The flask is also fitted with a stirrer. Enough pure, dry tetrahydrofuran is added just to cover the magnesium, which is then activated by the addition of a crystal of iodine or 1 cc. of ethyl bromide. 5 cc. of a solution of 175 g. of isoamylacetylene bromide (1 mole) in the remainder of 300 cc. of tetrahydrofuran are then added.

When the reaction has started, the addition of the bromide solution is adjusted so that the temperature is about 50° C.

After the addition is complete, the mixture is heated at about 80° C. for 1 to 2 hours. All the magnesium disappears and leaves a clear solution of isoamylacetylene magnesium bromide.

The Grignard reagent is not isolated but used directly as follows:

The isoamylacetylene magnesium bromide is cooled to about 0° C. and 35.2 g. of acetaldehyde (0.8 mole) in 100 cc. of tetrahydrofuran are added gradually. The mixture is left overnight whereafter it is decomposed and worked up in the usual manner (e.g. by pouring the mixture onto ice, acidifying with hydrochloric acid, separating the organic layer, drying it, and distilling off the solvent. The product may then be distilled under reduced pressure.). In this way 112 g. (80%) of 8-methyloct-3-yn-2-ol B.P. 92° C./16 mm. Hg are obtained. This compound has a density of 21° C. of 0.860 and a refractive index $n_D^{21}=1.4490$.

EXAMPLE II

Proceeding as in Example I but starting from 130.5 g. of isoamylacetylene chloride (1 mole) and 24.3 g. of magnesium, and reacting the Grignard solution with 46.4 g. of acetone (0.8 mole) in 100 cc. of diethyl ether, there is obtained 149.4 g. (97%) of 1,8-dimethyloct-3-yn-2-ol boiling at 90° C./17 mm. Hg. This compound has a density of 0.848 at 21° C., and a refractive index $n_D^{21}=1.4438$.

Proceeding in a similar way other acetylenic Grignard reagents may be prepared in accordance with this invention. The results obtained are summarised in the following tables:

Table I

[Grignard reagents R.C≡C.MgBr]

| R | Reactant | Product obtained | Yield, percent |
|---|---|---|---|
| $C_6H_5$— | $C_6H_5$—CO—$C_6H_5$ | $C_6H_5$—C≡C—C(OH)($C_6H_5$)$_2$ | 91 |
| $C_6H_5$— | $(CH_3)_2$CH—CHO | $C_6H_5$—C≡C—CHOH—CH($CH_3$)$_2$ | 91 |
| $C_6H_5$— | $CO_2$ | $(CH_3)_2$CH—$CH_2$—$CH_2$—C≡C.COOH | 75 |
| $(CH_3)_2$CH—$CH_2$—$CH_2$— | $CH_3$—CHO | $C_4H_9$—C≡C—CHOH—$CH_3$ | 75 |
| n. $C_4H_9$— | $ClCH_2OCH_3$ | $C_4H_9$—C≡C—$CH_2$—$OCH_3$ | 78 |
| n. $C_4H_9$— | $BrCH_2$—CH≡$CH_2$ | $C_4H_9$—C≡C—$CH_2$—CH≡$CH_2$ | 82 |
| $\begin{array}{c}CH_3\\ \diagdown\\ C-\\ \diagup\\ CH_2\end{array}$ | $CH_3$CHO | $\begin{array}{c}CH_3\\ \diagdown\\ C-C\equiv C-CHOH-CH_3\\ \diagup\\ CH_2\end{array}$ | 92 |
| $\begin{array}{c}CH_3-CH\\ \diagdown\\ C-\\ \diagup\\ CH_3\end{array}$ | $CH_3$CHO | $\begin{array}{c}CH_3-CH\\ \diagdown\\ C-C\equiv C-CHOH-CH_3\\ \diagup\\ H_3C\end{array}$ | 96 |
| $\begin{array}{c}CH_3-CH\\ \diagdown\\ C-\\ \diagup\\ CH_3\end{array}$ | $C_6H_{13}$CHO | $\begin{array}{c}CH_3-CH\\ \diagdown\\ C-C\equiv C-CHOH-C_6H_{11}\\ \diagup\\ CH_3\end{array}$ | 94 |
| C$_6$H$_5$— (phenyl) | $\begin{array}{c}CH_3-CO\\ \diagdown\\ O\\ \diagup\\ CH_3-CO\end{array}$ | $C_6H_5$—C≡C—CO—$CH_3$ | — |
| C$_6$H$_5$— (phenyl) | $CH_3$CHO | $C_6H_5$—C≡C—CHOH—$CH_3$ | 90 |
| $CH_2OH$—[1] | $C_3H_7$CHO | $CH_2OH$—C≡C—CHOH—$C_3H_7$ | 81 |
| $CH_3CHOH$[1] | $C_3H_7$CHO | $CH_3$—CHOH—C≡C—CHOH—$C_3H_7$ | 58 |
| $\begin{array}{c}CH_3\\ \diagdown\\ CH-CHOH-\\ \diagup\\ CH_3\end{array}$[1] | $C_3H_7$CHO | $\begin{array}{c}CH_3\\ \diagdown\\ CH-CHOH-C\equiv C-CHOH-C_3H_7\\ \diagup\\ CH_3\end{array}$ | 62 |

[1] For the preparation of the magnesium compounds of these acetylenic alcohols, the alcohol function in the form of ether is previously blocked with dihydropyran.

Table II

[Grignard reagents R.C≡C.MgCl]

| R | Reactant | Product obtained | Yield, percent |
|---|---|---|---|
| $(CH_3)_2$CH—$CH_2$—$CH_2$— | $CH_3$—CHO | $(CH_3)_2$CH—$CH_2$—$CH_2$—C≡C.CHOH—$CH_3$ | 83 |
| $C_4H_9$— | $CH_3$—CHO | $C_4H_9$—C≡C.CHOH—$CH_3$ | 75 |
| $C_4H_9$— | $CH_3$—CO—$C_2H_5$ | $C_4H_9$—C≡C.C(OH)($CH_3$)($C_2H_5$) | 96 |

EXAMPLE III

Proceeding as in Example I but starting from 161 g. of n-butylacetylene bromide (1 mole), 24.3 g. of magnesium, and diethyleneglycol diethylether as solvent, and reacting the Grignard solution with 46.4 g. of propylene oxide in 100 cc. of diethylether, there is obtained 98 g. (70%) of non-4-yn-2-ol.

Proceeding in a similar way in the same diether solvent other acetylenic Grignard reagents may be prepared. The results obtained are summarised in the following Table III.

Table III

[Grignard reagents R—C≡CMgBr]

| R | Reactant | Product Obtained | Yield, percent |
|---|---|---|---|
| n.$C_4H_9$— | $SO_4(CH_3)_2$ | $C_4H_9$—C≡C—$CH_3$ | 74 |
| $\begin{array}{c}CH_3\\ \diagdown\\ C-\\ \diagup\\ CH_2\end{array}$ | $C_3H_7$CHO | $\begin{array}{c}CH_3\\ \diagdown\\ C-C\equiv C-CHOH-C_3H_7\\ \diagup\\ CH_2\end{array}$ | 93 |
| C$_6$H$_5$— (phenyl) | $C_6H_{13}$CHO | $C_6H_5$—C≡C—CHOH—$C_6H_{11}$ | 76 |
| $CH_2OH(CH_2)_2$—[1] | $C_3H_7$CHO | $CH_2OH(CH_2)_2$C≡C—CHOH—$C_3H_7$ | 60 |

[1] For the preparation of the magnesium compound the alcohol function in the form of ether is previously blocked with dihydropyran.

EXAMPLE IV

Proceeding as in Example I but starting from 161 g. (1 mole) of n-butylacetylene bromide, 24.3 grams of magnesium and diethyleneglycol dibutylether as solvent, and reacting the Grignard solution with 35.2 (0.8 mole) of acetaldehyde in 100 cc. of diethyl ether, there is obtained 102 g. (81%) of n-oct-3-yn-2-ol.

In a similar manner starting from $C_6H_5$—C≡C—Br and reacting the Grignard solution with $BrCH_2\text{---}CH\text{=}CH_2$ there is obtained $$C_6H_5\text{---}C{\equiv}C\text{---}CH_2\text{---}CH{=}CH_2$$

(yield=82%).

I claim:

1. A process for the production of acetylenic Grignard compounds which comprises reacting an acetylenic compound of general formula $R.C{\equiv}C.X'$ (wherein R represents radical chosen from the group consisting of alkyl, aryl, and aralkyl groups, and X' represents an atom chosen from the group consisting of chlorine and bromine atoms) with magnesium under substantially anhydrous conditions in a solvent ether chosen from the group consisting of ethers of general formula

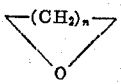

(wherein n is chosen from the group consisting of 4 and 5), and polyethyleneglycol diethers of general formula $R'''(OCH_2CH_2)_nOR'''$ (wherein R'' and R''' represent alkyl groups and n is an integer).

2. A process for the production of acetylenic Grignard compounds which comprises reacting an acetylenic compound of general formula $R.C{\equiv}C.X'$ (wherein R represents radical chosen from the group consisting of alkyl, aryl, and aralkyl groups and X' represents an atom chosen from the group consisting of chlorine and bromine atoms) with magnesium under substantially anhydrous conditions in tetrahydrofuran.

3. A process for the production of acetylenic Grignard compounds which comprises reacting an acetylenic compound of general formula $R.C{\equiv}C.X'$ (wherein R represents radical chosen from the group consisting of alkyl, aryl, and aralkyl groups and X' represents an atom chosen from the group consisting of chlorine and bromine atoms) with magnesium under substantially anhydrous conditions in 2-methyl-tetrahydrofuran.

4. A process for the production of acetylenic Grignard compounds which comprises reacting an acetylenic compound of general formula $R.C{\equiv}C.X'$ (wherein R represents radical chosen from the group consisting of alkyl, aryl and aralkyl groups and X' represents an atom chosen from the group consisting of chlorine and bromine atoms) with magnesium under substantially anhydrous conditions in tetrahydropyran.

5. A process for the production of acetylenic Grignard compounds which comprises reacting an acetylenic compound of general formula $R.C{\equiv}C.X'$ (wherein R represents radical chosen from the group consisting of alkyl, aryl and aralkyl groups and X' represents an atom chosen from the group consisting of chlorine and bromine atoms) with magnesium under substantially anhydrous conditions in diethyleneglycol diethylether.

6. A process for the production of acetylenic Grignard compounds which comprises reacting an acetylenic compound of general formula $R.C{\equiv}C.X'$ (wherein R represents radical chosen from the group consisting of alkyl, aryl and aralkyl groups and X' represents an atom chosen from the group consisting of chlorine and bromine atoms) and magnesium under substantially anhydrous conditions in diethyleneglycol dibutylether.

7. A process for the production of acetylenic Grignard compounds which comprises reacting an acetylenic compound of general formula $R.C{\equiv}C.X'$ (wherein R represents radical chosen from the group consisting of alkyl, aryl and aralkyl groups, and X' represents an atom chosen from the group consisting of chlorine and bromine atoms) with magnesium under substantially anhydrous conditions in an ether chosen from the group consisting of cyclic ethers of general formula

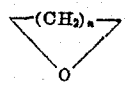

(wherein n is chosen from the group consisting of 4 and 5), and polyethyleneglycol diethers of general formula $R''(OCH_2CH_2)_nOR'''$ (wherein R'' and R''' represent alkyl groups and n is an integer) under a current of dry nitrogen.

8. A Grignard reagent in the form of a composition comprising at least one acetylenic Grignard reagent of the general formula $R.C{\equiv}CMgX'$ (wherein R represents a radical chosen from the group consisting of alkyl, aryl and aralkyl groups, and X' represents an atom chosen from the group consisting of chlorine and bromine atoms) in association with at least one solvent chosen from the group consisting of an ether chosen from the group consisting of cyclic ethers of general formula

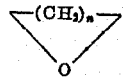

(wherein n is chosen from the group consisting of 4 and 5), and polyethyleneglycol diethers of general formula $R''(OCH_2CH_2)_nOR'''$ (wherein R'' and R''' represent alkyl groups and n is an integer).

References Cited in the file of this patent

UNITED STATES PATENTS

| | | |
|---|---|---|
| 2,108,213 | Scott et al. | Feb. 15, 1938 |
| 2,552,676 | Hill | May 15, 1951 |
| 2,838,508 | Ramsden | June 10, 1958 |
| 2,887,371 | Bennett et al. | May 19, 1959 |

OTHER REFERENCES

Raphael: "Acetylenic Compounds in Organic Synthesis"; page 58, Academic Press Inc. (New York).